United States Patent
Li et al.

(10) Patent No.: US 8,733,716 B2
(45) Date of Patent: May 27, 2014

(54) ELECTRONIC DEVICE WITH MOUNTING APPARATUS

(75) Inventors: Bin Li, Shenzhen (CN); Guang-Yao Lee, New Taipei (TW); Yi-Sheng Lin, New Taipei (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 290 days.

(21) Appl. No.: 13/209,458

(22) Filed: Aug. 15, 2011

(65) Prior Publication Data

US 2012/0250232 A1     Oct. 4, 2012

(30) Foreign Application Priority Data

Apr. 2, 2011  (CN) .......................... 2011 1 0083116

(51) Int. Cl.
*A47B 96/00* (2006.01)
*F16M 11/16* (2006.01)
*A47G 1/24* (2006.01)
*E05C 1/08* (2006.01)

(52) U.S. Cl.
USPC ....... 248/188; 248/220.22; 248/457; 292/163

(58) Field of Classification Search
USPC .............. 248/188, 220.22, 221.11, 457, 462, 248/463, 923; 292/163, 175, DIG. 11, 292/DIG. 37

See application file for complete search history.

(56) References Cited

U.S. PATENT DOCUMENTS

| | | | | |
|---|---|---|---|---|
| 5,730,406 | A  * | 3/1998 | Chen ........................ | 248/223.41 |
| 6,256,075 | B1 * | 7/2001 | Yang ............................ | 348/843 |
| 7,129,996 | B2 * | 10/2006 | Maruta ........................ | 348/794 |
| 7,389,963 | B2 * | 6/2008 | Cho et al. ..................... | 248/159 |
| 7,458,550 | B2 * | 12/2008 | Chang ......................... | 248/309.1 |
| 7,481,403 | B2 * | 1/2009 | Yuan .......................... | 248/125.1 |
| 7,819,368 | B2 * | 10/2010 | Jung et al. .................... | 248/133 |
| 8,348,206 | B2 * | 1/2013 | Wang et al. ................. | 248/176.1 |
| 2006/0076463 | A1 * | 4/2006 | Drew ............................ | 248/121 |
| 2007/0008686 | A1 * | 1/2007 | Jang ............................ | 361/681 |

* cited by examiner

*Primary Examiner* — Jonathan Liu
*Assistant Examiner* — Chiedu Chibogu
(74) *Attorney, Agent, or Firm* — Novak Druce Connolly Bove + Quigg LLP

(57) ABSTRACT

An electronic device includes a main body, a mounting device, and a supporting device. The mounting device attaches to the main body, and includes a mounting member, a bracket, and a latch. The bracket is mounted to the mounting member; the latch includes a securing section, and is slidably mounted to the bracket. The supporting device includes a retaining tab to engage the securing section. The supporting device is to be removed from the mounting device when the latch slides on the bracket to detach the securing section from the retaining tab.

4 Claims, 10 Drawing Sheets

ELECTRONIC DEVICE WITH MOUNTING APPARATUS

BACKGROUND

1. Technical Field

The present disclosure relates to an electronic device, and particularly, to an electronic device having a mounting apparatus.

2. Description of Related Art

An electronic device, such as an all-in-one computer or an LCD monitor, is often screwed to a stand for setting on the table. However, it is inconvenient to disassemble the stand from the electronic device when the electronic device needs to be separated from the stand, and, for example, must then be mounted to a wall.

Therefore, what is needed is an electronic device having a quick-release mounting apparatus that overcomes the problem.

BRIEF DESCRIPTION OF THE DRAWINGS

The components in the drawings are not necessarily drawn to scale, the emphasis instead being placed upon clearly illustrating the principles of an electronic device having a quick-release mounting apparatus. Moreover, in the drawings, like reference numerals designate corresponding parts throughout the several views.

DETAILED DESCRIPTION

Figure 1:
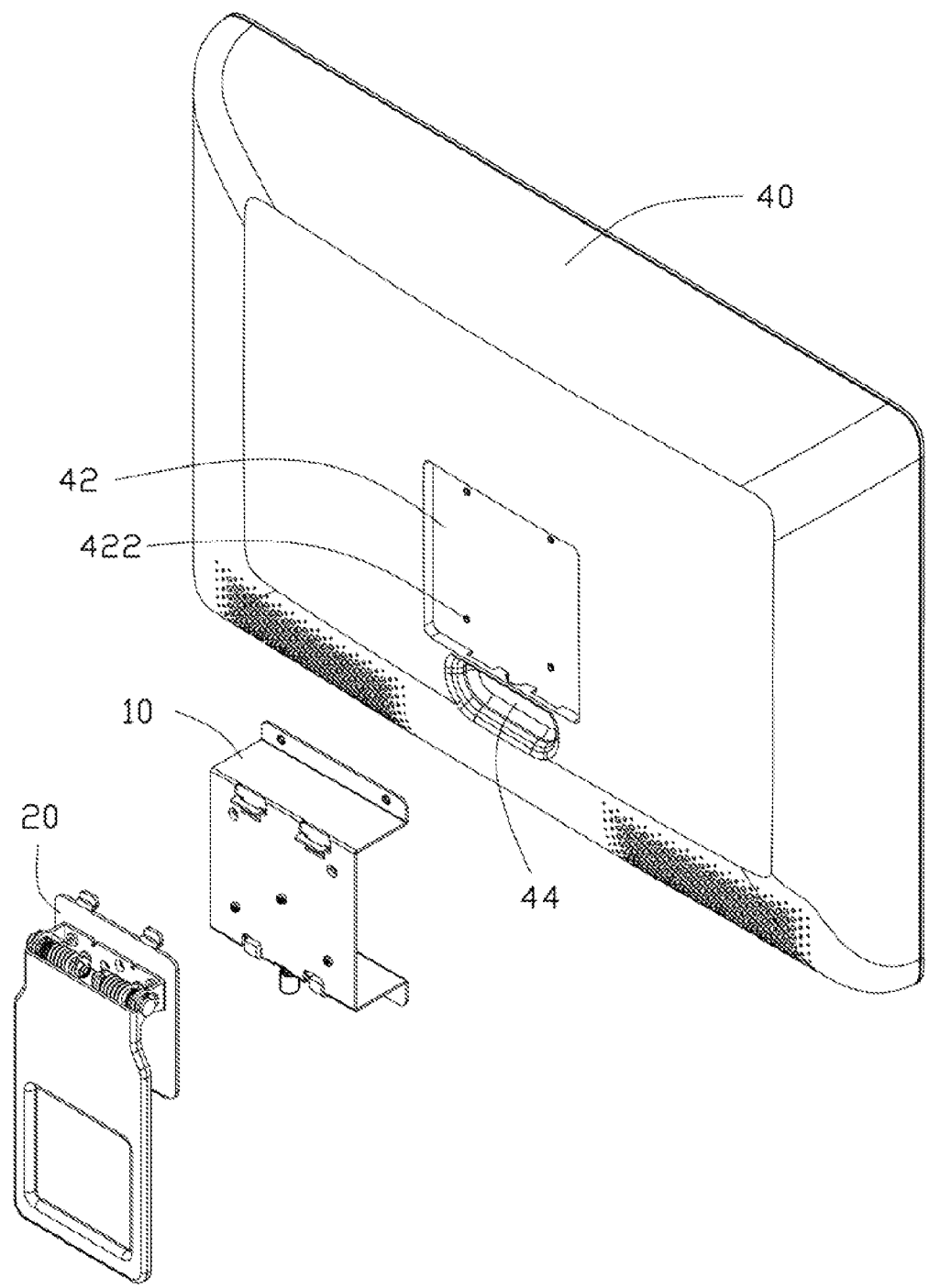
FIG. 1 is an isometric, exploded view of an electronic device, including a mounting device and a supporting device, in accordance with an exemplary embodiment.

Referring to FIG. 1, an embodiment of an electronic device includes a mounting device 10, a main body 40, and a supporting device 20. The main body 40 defines a recess 42 thereon, and an operation chamber 44 is defined below the recess 42 on the main body 40. Four mounting holes 422 are defined in the bottom of the recess 42. In the present embodiment, the main body 40 is part of an all-in-one computer.

Figure 2:
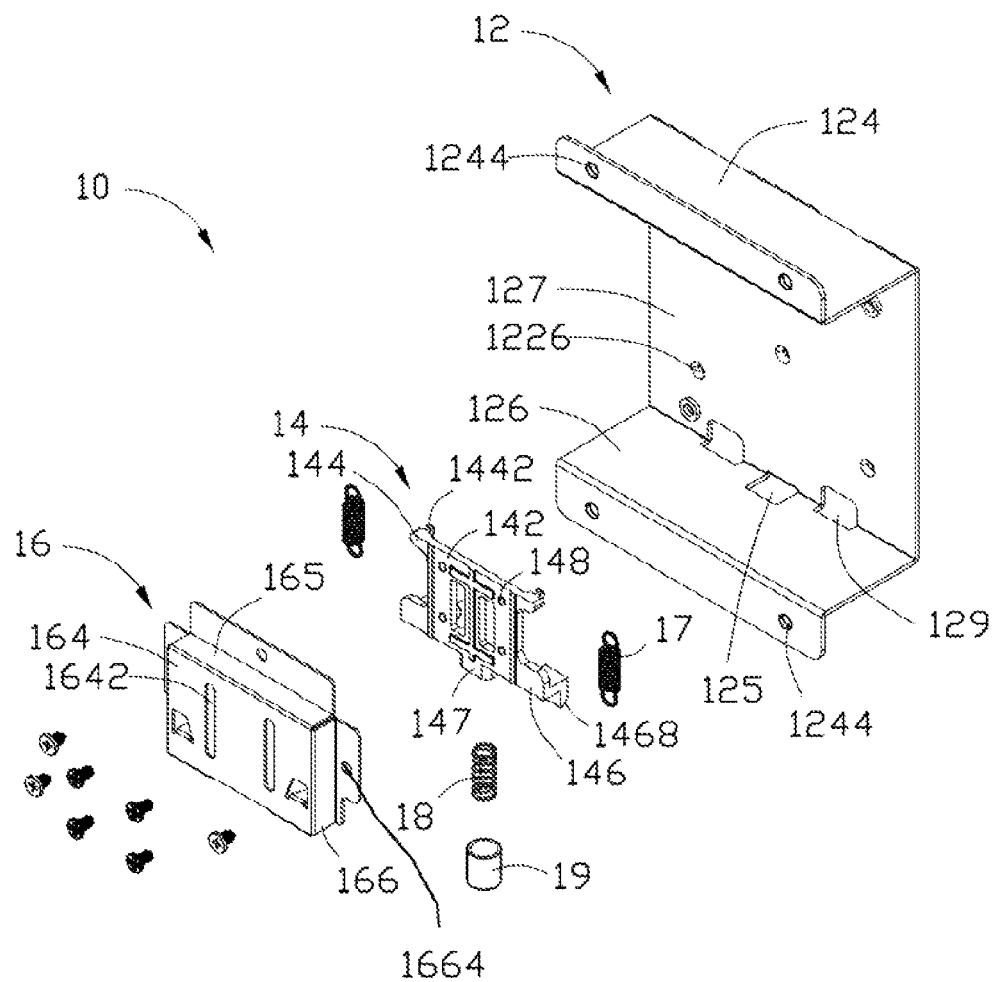
FIG. 2 is an isometric, exploded view of the mounting device of FIG. 1.
Figure 3:
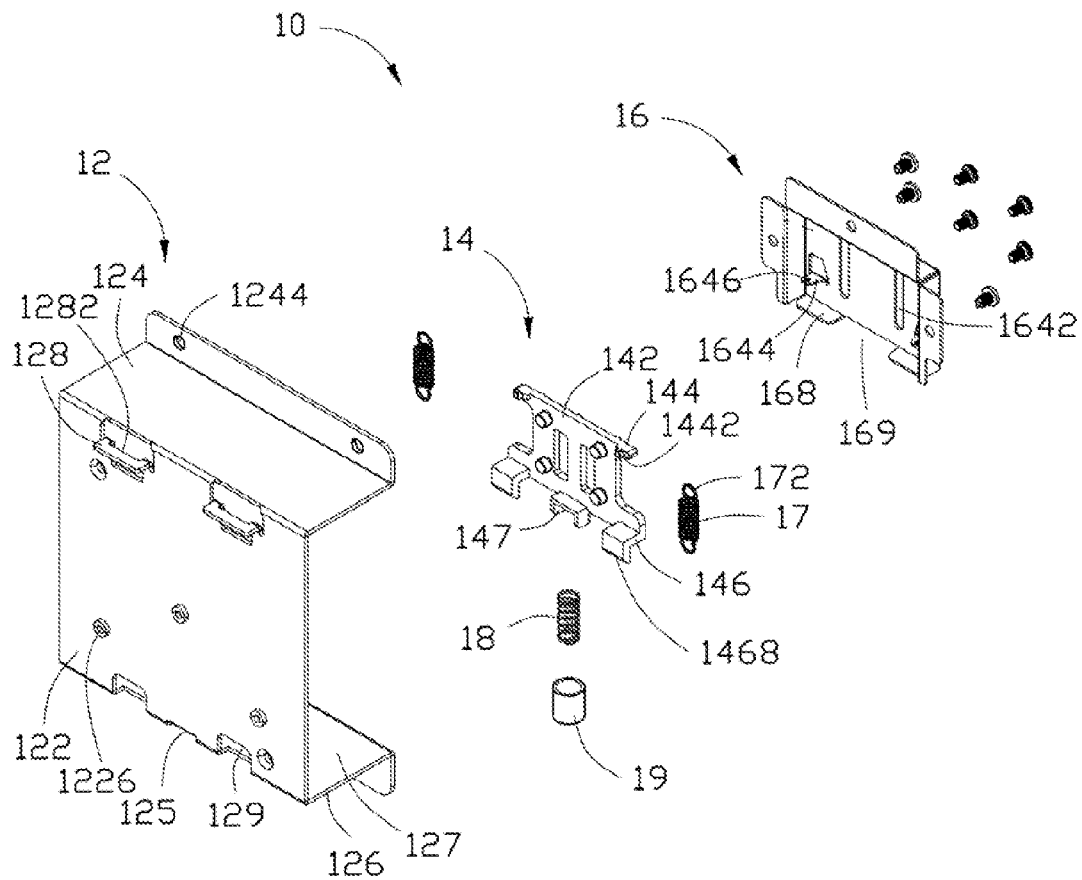
FIG. 3 is an isometric, exploded view of another aspect of the mounting device of FIG. 2.
Figure 4:
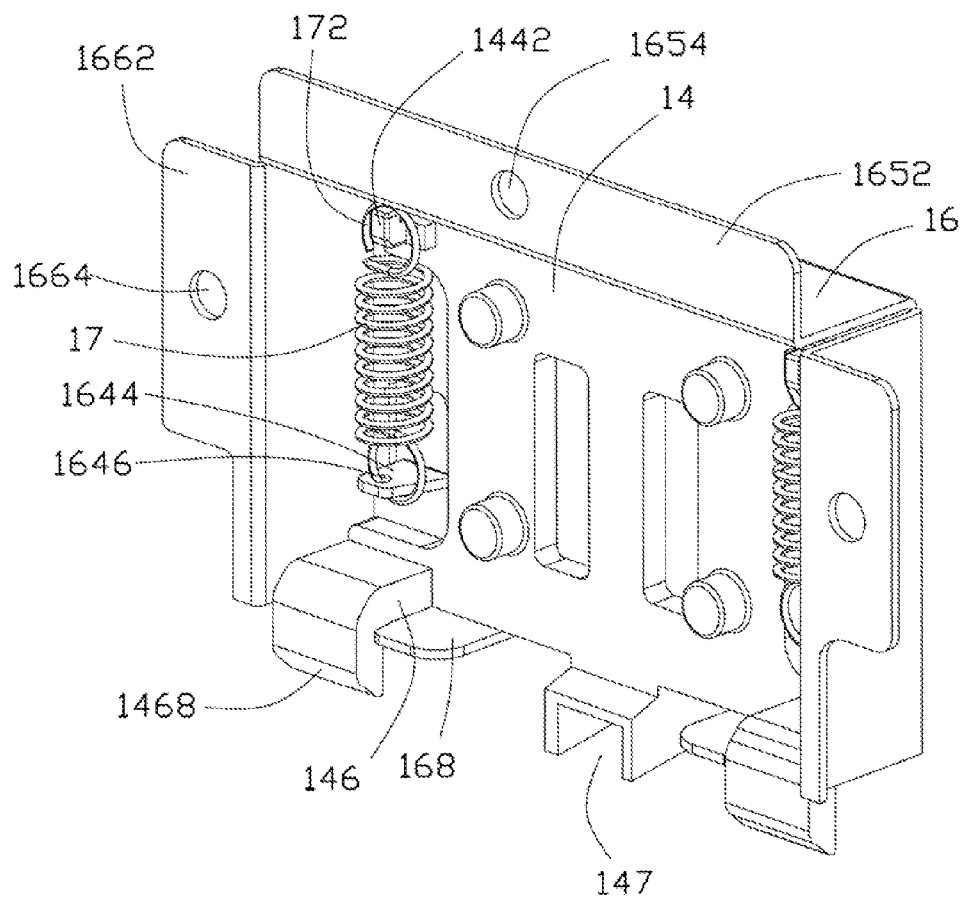
FIG. 4 is an isometric view of the assembled mounting device of FIG. 2.

Referring to FIG. 2-3, the mounting device 10 includes a mounting member 12, a latch 14, a bracket 16, two first resilient members 17, a second resilient member 18, and a latch button 19.

The mounting member 12 includes a square-shaped mounting plate 122, and a top mounting plate 124 and a bottom mounting plate 126 extending from the mounting plate 122 to form a hollow 127 between the mounting plate 122, the top mounting plate 124, and the bottom mounting plate 126. Two mounting holes 1244 are defined on a side piece extended perpendicularly from the top mounting plate 124 and two another mounting holes 1244 on a side piece extended perpendicularly from the bottom plate 126. Two fixing pieces 128 are arranged on the upper end of the mounting plate 122, and a fixing hole 1282 is defined beside each fixing piece 128. A through hole 125 and two passages 129 are defined on the intersection of the mounting plate 122 and the bottom mounting plate 126, and the through hole 125 is defined between the two passage 129s. Three mounting holes 1282 are defined on the mounting plate 122.

The latch 14 includes a latch plate 142, and two hangers 144 are arranged on the two ends of the top of the latch plate 142. Two L-shaped securing sections 146 are arranged on the two ends of the bottom of the latch plate 142, and an inclined pushing surface 1468 is defined on the bottom of each securing section 146. An actuating section 147 is arranged between the two securing sections 146. Four mounting holes 148 are defined on the latch plate 142.

The bracket 16 includes a back plate 164; a top plate 165 extends from the back plate 164; and two side plates 166 extend from the two sides of the back plate 164. Two elongated sliding ditches 1642 are defined in the middle of the back plate 164. Two tabs 1644 extends from the back plate 164, and two tab holes 1646 are defined respectively on each of the two tabs 1644. Two block pieces 168 extend perpendicularly from the back plate 164. A mounting hole 1664 is defined on a lateral extension from the top plate 165 and on lateral extensions from each of the two side plates 166.

In the present embodiment, the first resilient members 17 are tension coil springs with hooks 172 on both ends. The second resilient member 18 is a coil spring. The latch button 19 is a cylindrical sleeve.

Figure 5:
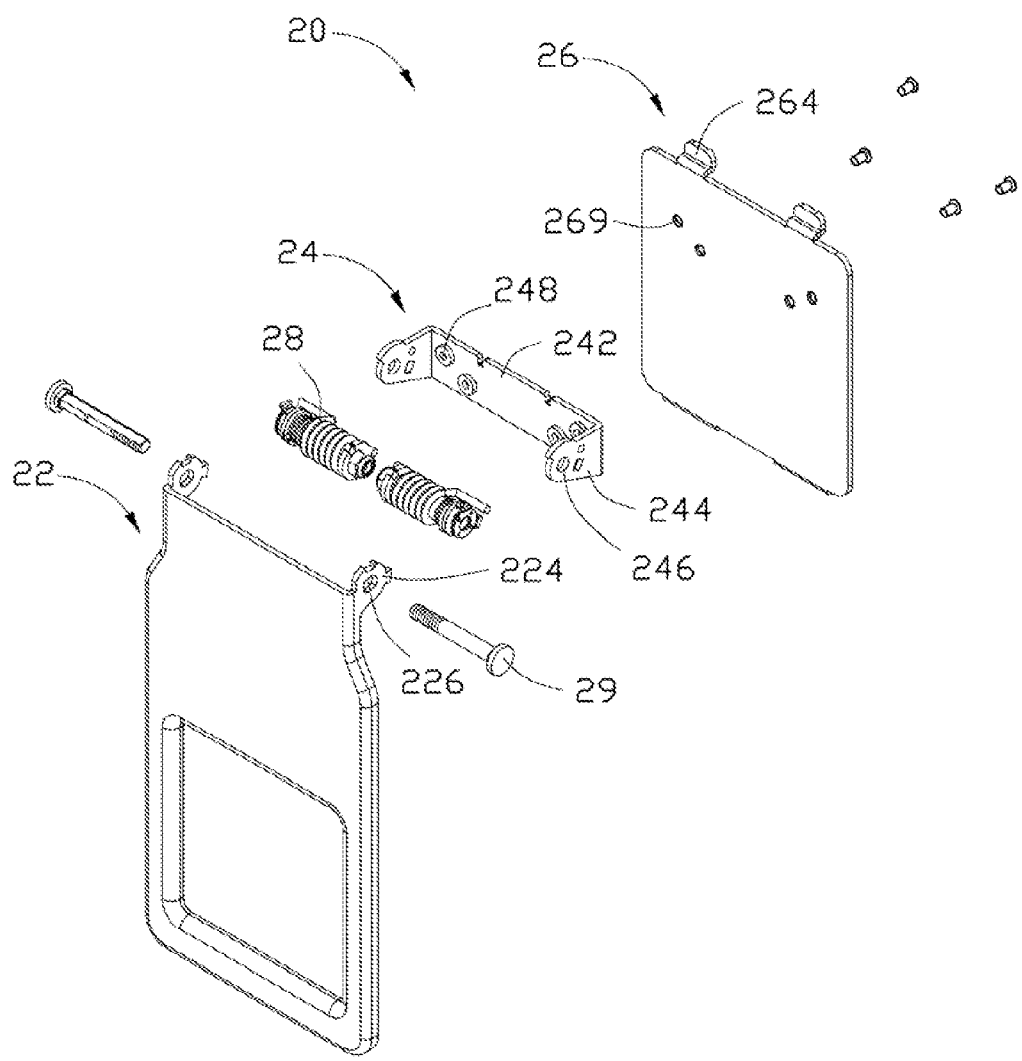
FIG. 5 is an isometric, exploded view of the supporting device of FIG. 1.
Figure 6:
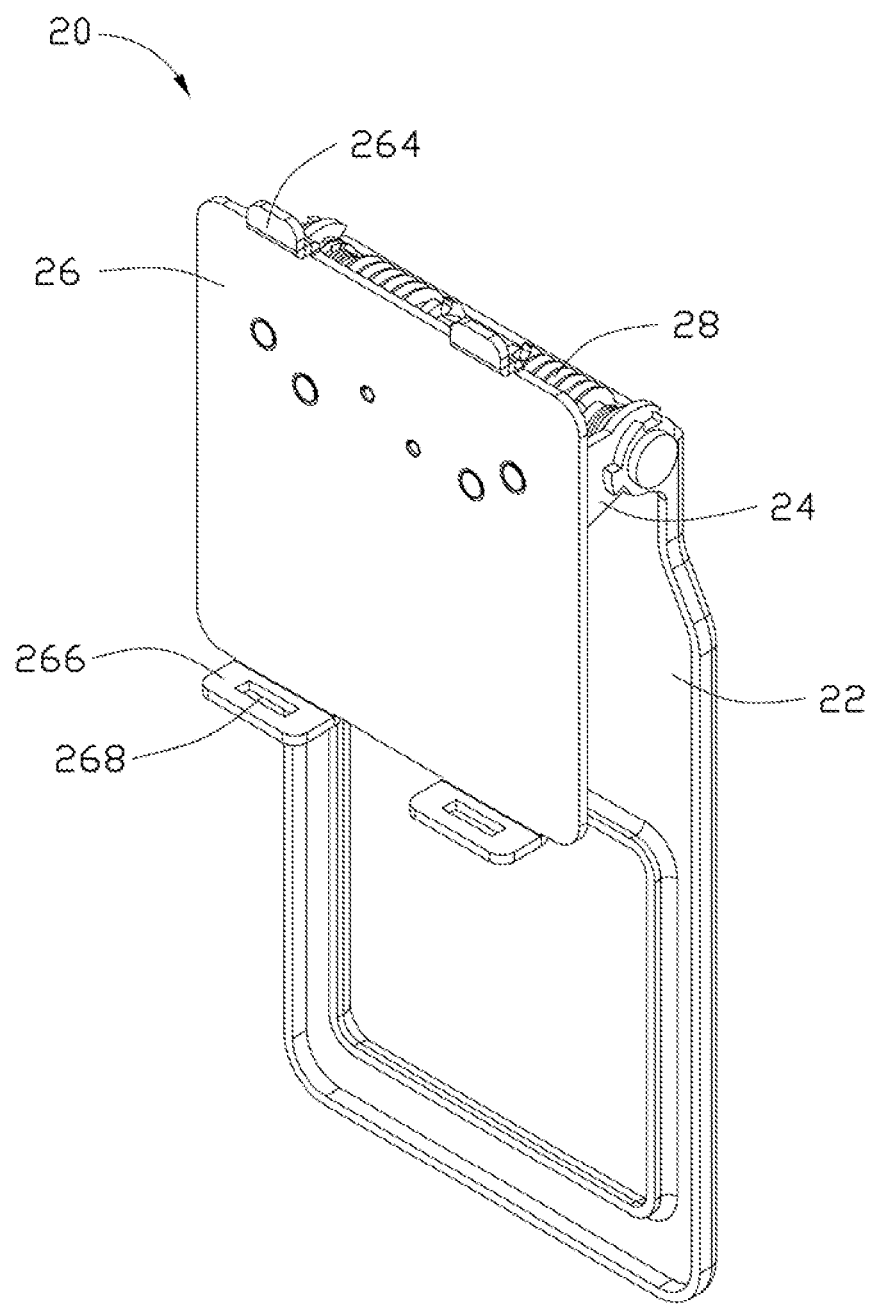
FIG. 6 is an isometric, assembled view of the supporting device of FIG. 5.

Referring to FIG. 5-6, the supporting device 20 includes a hinge member 22, a linking member 24, a stand support 26, and two hinges 28. Two first pivot sections 224 are arranged on top of the hinge member 22, and a first pivot hole 226 is defined on the first pivot section 224.

The linking member 24 includes a linking section 242 and two second pivot sections 244 extending from the linking section 242, and a second pivot hole 246 is defined on each second pivot section 244. Four mounting holes 248 are defined on the linking member 24.

The stand support 26 is a square plate with two L-shaped fixing tabs 264 arranged on the top of the stand support 26, and two retaining tabs 266 with retaining holes 268 defined therein extend from the bottom of the stand support 26. Four mounting holes 269 are defined on the stand support 26 so as to align with the four mounting holes 248.

Referring to FIG. 1-4, when assembling the mounting device 10, the latch 14 is engaged with the bracket 16; the latch plate 142 is positioned between the two tabs 1644, and the securing sections 146 abut the block pieces 168 of the bracket 16. The actuating section 147 is positioned between the two block pieces 168. The latch 14 is slidably fixed to the bracket 16 through the two sliding ditches 1642, with four mounting elements mounted to the four mounting holes 148 of the latch plate 142, so that the latch 14 can move vertically in the two sliding ditches 1642. The hooks 172 of the first resilient member 17 are mounted to the hanger 144 of the latch 14 and the tab hole 1646 of the tab 1644 of the bracket 16. The two ends of the second resilient member 18 abut the latch button 19 and the actuating section 147 of the latch 14. The bracket 16 is engaged to the mounting plate 122 of the mounting member 12; the securing section 146 penetrates the passage 129 of the mounting member 12, and the latch button 19 penetrates the through hole 125 of the mounting member 12. The bracket 16 is mounted with screws to the mounting plate 122 of the mounting member 12 through the mounting hole 1664 of the bracket 16 and the mounting holes 1226 of the mounting plate 122.

The mounting device 10 is screw-mounted to the recess 42 of the main body 40 through the mounting holes 1244 of the mounting member 12 and the mounting holes 422 of the recess 42, and the latch button 19 exposed from the mounting member 12 is received in the operation chamber 44 of the main body 40.

Referring to FIG. 5-6, when assembling the supporting device 20, the two second pivot sections 244 of the linking member 24 engage with the two first pivot sections 224 of the hinge member 22, and the two hinges 28 are received between the two second pivot sections 244. The hinges 28, the first pivot holes 226, and the second pivot holes 246 are all aligned, and two bolts 29 penetrate through the first pivot section holes 226, the second pivot section holes 246, and the hinges 28. Two nuts (not shown) and two bolts fasten the linking member 24 to the hinge member 22. Four screws mount the linking member 24 to the stand support 26 through the mounting holes 269 of the stand support 26 and the mounting holes 248 of the linking section 242.

Figure 7:
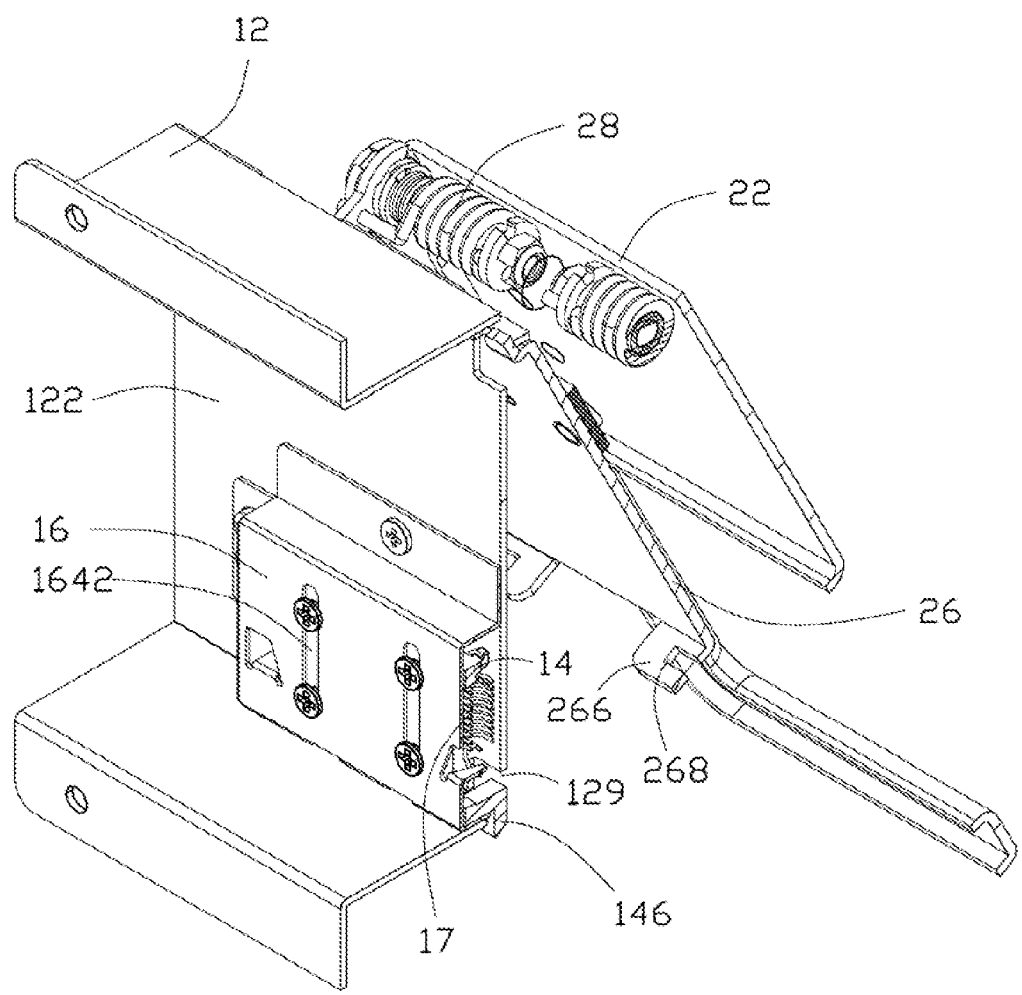
FIGS. 7-10 are isometric views showing an installation process for the electronic device of FIG. 1, in accordance with an exemplary embodiment.
Figure 8:
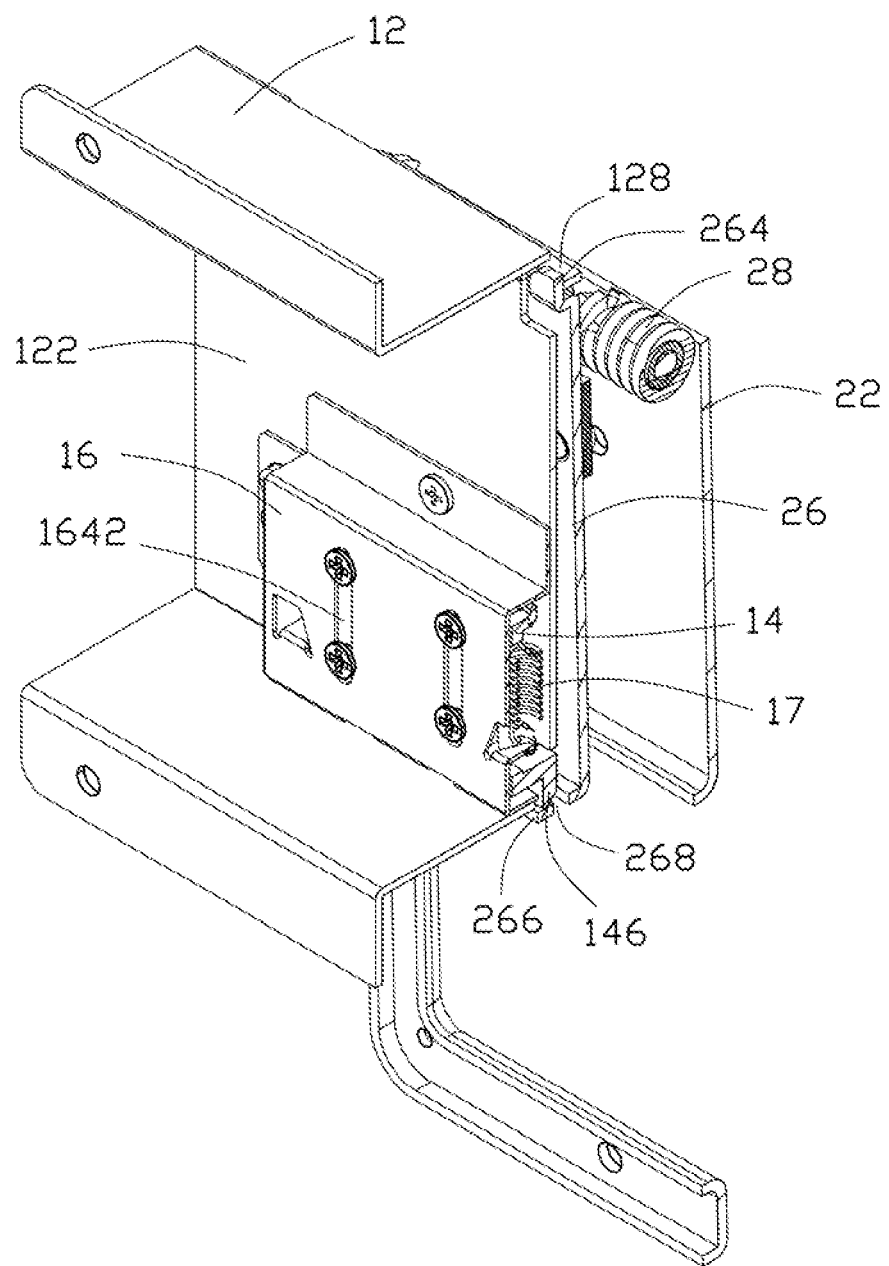
Figure 9:
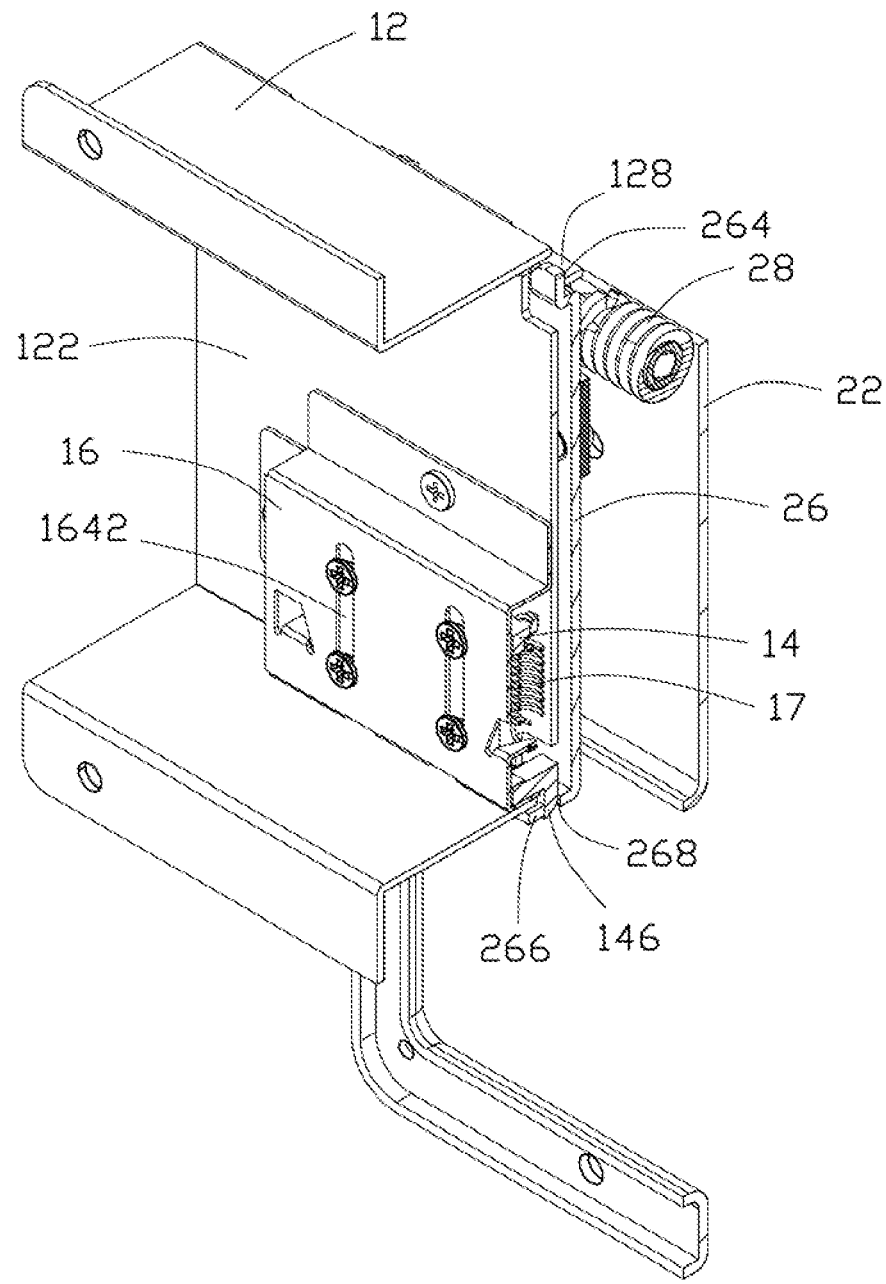
Figure 10:
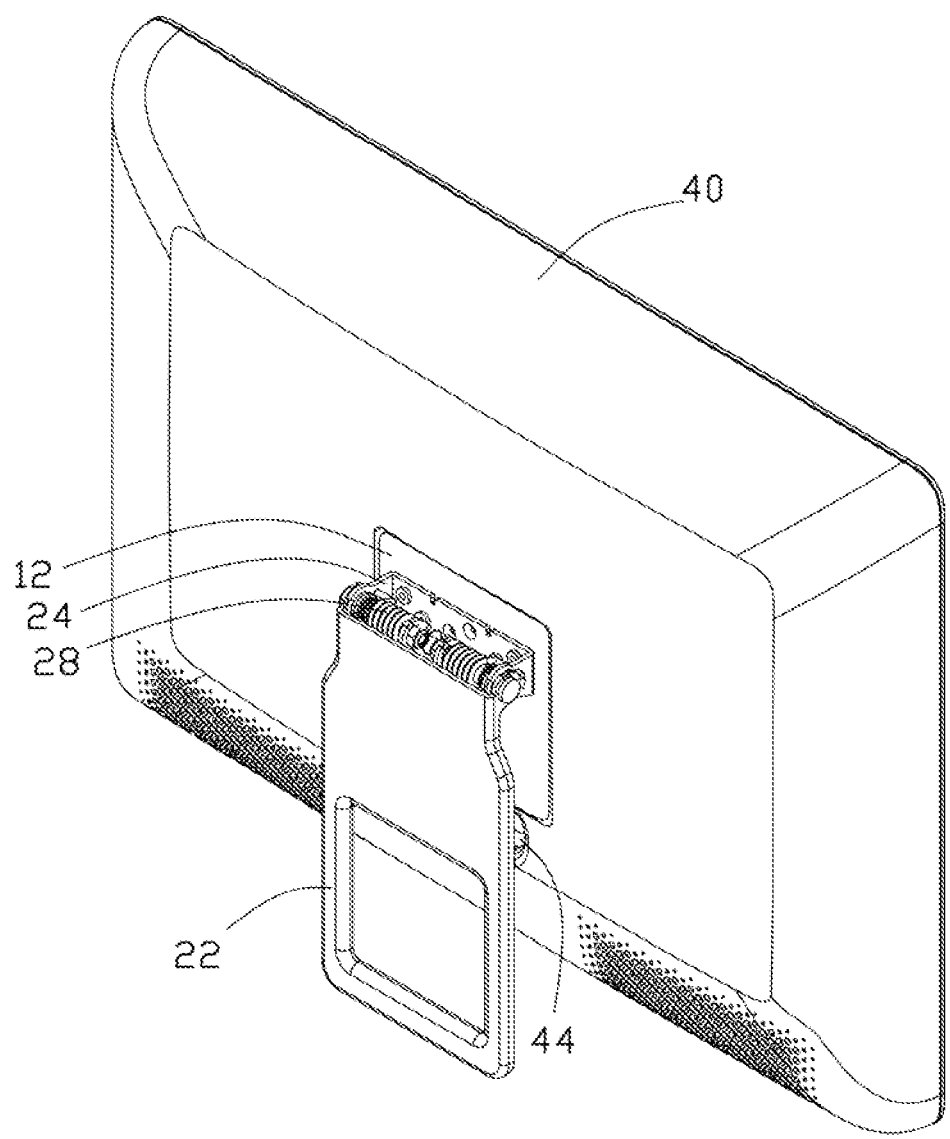

Referring to FIG. 7-10, when assembling the supporting device 20 to the mounting device 10, the fixing tabs 264 of the stand support 26 engage with the fixing hole 1282 of the mounting member 12 (FIG. 7). The supporting device 20 is pushed toward the mounting device 10, and the retaining tabs 266 of the stand support 26 abut the pushing surfaces 1468 of the securing section 146 of the latch 14; the latch 14 being forced to move upwards along the sliding ditches 1642 of the bracket 16, and the first resilient members 17 become stretched (FIG. 8). The supporting device 20 is completely engaged with the mounting device 10 when the securing sections 146 of the latch 14 are received in the retaining holes 268 of the retaining tabs 268 of the stand support 26, and the first resilient member 17 are released to force the latch 14 to move downwards to fasten the securing sections 146 to the retaining holes 268 (FIG. 9). The supporting device 20 is thus assembled to the main body 40 through the mounting device 10.

When disassembling the supporting device 20, the latch button 19 is pressed to force the latch 14 upwards, and the first resilient members 17 become stretched. When the securing sections 146 disengage from the retaining holes 268 of the stand support 26, the supporting device 20 is pulled away from the mounting device 10, to allow the fixing tabs 264 to disengage from the fixing holes 1282. The main body 40 can be hung on the wall after the supporting device 20 is removed.

Although the present disclosure has been specifically described on the basis of this exemplary embodiment, the disclosure is not to be construed as being limited thereto. Various changes or modifications may be made to the embodiment without departing from the scope and spirit of the disclosure.

What is claimed is:

1. An electronic device, comprising:
   a main body;
   a mounting device attached to the main body, comprising a mounting member, a bracket, and a latch; the bracket being mounted to the mounting member; the latch comprising a securing section, and being slidably mounted to the bracket;
   a supporting device comprising a retaining tab to engage the securing section; wherein the supporting device is to be removed from the mounting device when the latch slides on the bracket to detach the securing section from the retaining tab;
       wherein the latch is slidably mounted to a sliding ditch defined on the bracket; two ends of a first resilient member is fixed to a hanger arranged on the latch and a tab arranged on the bracket to pull the securing section to fasten the retaining tab;
       wherein an actuating section is arranged on the latch; the first resilient member is deformed when the actuating section is pushed to detach the securing section from the retaining tab;
       wherein the actuating section is engaged with an end of a second resilient member, and the other end of the second resilient member is received in a latch button; the latch button is pressed to push the latch to detach the securing section from the retaining tab;
   wherein a through hole defined on the mounting member allows the latch button to be exposed to an outer side of the mounting member.

2. The electronic device as claimed in claim 1, wherein a passage defined on the mounting member allows the securing section to be exposed to an outer side of the mounting member.

3. The electronic device as claimed in claim 1, wherein the mounting member is mounted to a recess defined on the electronic device, and the bracket and the latch are received between the recess and the mounting member.

4. The electronic device as claimed in claim 1, wherein a fixing tab arranged on the supporting member engages to a fixing hole defined on the mounting member when assembling the supporting member to the mounting member.

* * * * *